(12) United States Patent
Hsu (10) Patent No.: US 10,807,328 B2
(45) Date of Patent: *Oct. 20, 2020

(54) METHODS AND SYSTEMS FOR MAKING AN OPTICAL FUNCTIONAL FILM

(71) Applicant: Roger Wen Yi Hsu, Rancho Cucamonga, CA (US)

(72) Inventor: Roger Wen Yi Hsu, Rancho Cucamonga, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/895,564

(22) Filed: Feb. 13, 2018

(65) Prior Publication Data

US 2018/0272633 A1 Sep. 27, 2018

Related U.S. Application Data

(63) Continuation-in-part of application No. 14/886,078, filed on Oct. 18, 2015, now Pat. No. 10,611,106.

(51) Int. Cl.
| | |
|---|---|
| *B29D 11/00* | (2006.01) |
| *G02B 1/08* | (2006.01) |
| *G02B 1/14* | (2015.01) |
| *B29K 31/00* | (2006.01) |
| *G02C 7/12* | (2006.01) |

(52) U.S. Cl.
CPC .... *B29D 11/00644* (2013.01); *B29D 11/0073* (2013.01); *B29D 11/00788* (2013.01); *B29D 11/00913* (2013.01); *G02B 1/08* (2013.01); *B29K 2031/04* (2013.01); *G02B 1/14* (2015.01); *G02C 7/12* (2013.01)

(58) Field of Classification Search
CPC ........ B29D 11/00644; B29D 11/00913; B29D 11/0073; B29D 11/00788; G02B 1/08
See application file for complete search history.

(56) References Cited

U.S. PATENT DOCUMENTS

| | | | | |
|---|---|---|---|---|
| 2002/0005509 | A1* | 1/2002 | Teng | G02B 5/223 |
| | | | | 252/582 |
| 2007/0054216 | A1* | 3/2007 | Habu | C09B 47/045 |
| | | | | 430/270.1 |
| 2011/0194179 | A1* | 8/2011 | Hsu | B29D 11/00634 |
| | | | | 359/465 |
| 2012/0016244 | A1* | 1/2012 | Caffey | G02B 21/0012 |
| | | | | 600/473 |
| 2013/0088772 | A1* | 4/2013 | Hsu | G02B 5/223 |
| | | | | 359/352 |

* cited by examiner

*Primary Examiner* — Mathieu D Vargot (57) ABSTRACT

A method to make dyed functional film comprising the steps of providing a soluble polymer material; adding an appropriate solvent to the polymer material to make a soluble polymer solution; providing a soluble dye; adding an appropriate solvent to the dye to make a soluble dye solution; adding the dye solution to the polymer or PVA solution, and introducing the dyed polymer or PVA solution to a solution casting device; removing a thin dyed functional film from the casting device; and letting the dyed functional film dry and solidified.

24 Claims, 6 Drawing Sheets

METHODS AND SYSTEMS FOR MAKING AN OPTICAL FUNCTIONAL FILM

INCORPORATION BY REFERENCE

This continuation in part application claims the benefit of priority to the filing date of U.S. non provisional patent application Ser. No. 14/886,078 "Methods and Systems For Making An Optical Functional Film" which was filed on Oct. 18, 2015, now U.S. Pat. No. 10,611,106, which claims the benefit of priority under 35 U.S.C. 119(e) to the filing date of U.S. non provisional patent application Ser. No. 14/806,579 "Methods and Systems For Making An Optical Functional Film" which was filed on Jul. 22, 2015, now abandoned, which claims the benefit of priority under 35 U.S.C. 119(e) to the filing date of U.S. provisional patent application No. 62/116,545 "Solution Casting Method" which was filed on Feb. 15, 2015, and which are incorporated herein by reference in their entirety.

FIELD OF THE INVENTION

The present invention relates generally to an optical component, and more particularly it is directed to methods and system of making functional plastic film, functional Polymer film, or functional PVA film or functional PET film.

BACKGROUND OF THE INVENTION

It is well known that Ultraviolet (UV) light can cause serious flash burns to the cornea from high intensity light sources. Thus our eyes need protection from these harmful UV lights. The situations where our eyes definitely need protection from UV lights are welding, exposure to sunlight at elevation above 5000 ft (1524 in), or when the sun glares off snow or water, tanning, etc.

Not just UV light, infrared is also harmful. Wireless communication, appliances, computer, and lights all emit different levels of harmful radiation. In fact, there are also plenty of natural infrared, such as those from sunlight. Sunlight is composed of thermal-spectrum radiation that is slightly more than half infrared. At zenith, sunlight provides an irradiance of approximately 1 kilowatt per square meter at sea level, of which 527 watts is infrared radiation. Once the sunlight reaches the surface of Earth, almost all thermal radiation are of infrared.

The energy of sunlight on the ground can be categorized into approximately 3% Ultraviolet (UV) rays, 44% visible rays, and 53% Infrared (IR) rays. Therefore, when exposed to intense sunlight for a lengthy period of time without protection, human eyes may experience a burning or stinging sensation that is often accompanied by fatigue. Such discomfort can be especially noticeable for those wearing contact lenses, as the infrared can be absorbed by the contact lenses causing them to "warm up". Eye doctors always encourage a habit of putting on sunglasses when staying out in the sun for a period.

Traditionally, for protection lens to block harmful rays from a light source, the lenses must be coated with one or more layers of IR and/or visible dyes. Usually, soluble dyes and/or metallic oxide pigments are used for coating to absorb or reflect light of certain frequencies, eg., IR frequencies, UV frequencies, etc. Thus, coated lens would reduce or mitigate eye diseases such as cataract and glaucoma.

Because of the importance of sunglasses and protecting eyewear, there have been many coating techniques invented. IR or visible coating can be applied by dipping or spraying a solvent IR or visible dyes on another optical layer of a lens. However, because the majority of lenses are curved, the curvature of the lenses presents a significant obstacle in the application of the IR or visible coating, as the application of the coating may be uneven. As a consequence, the uneven application of the coating on a curved surface would reduce the effectiveness of the protection layers.

Using traditional methods like extrusion or injection, IR or visible dyes are added during the processes. Extrusion is a process used to create objects of a fixed cross-sectional profile. A material is pushed or pulled through a die of the desired cross-section. In a plastic extruding process, plastic is first melted into a viscous, semi-liquid state. After it softens, the plastic is pressed through a contoured opening. Using this technique, a curved lens may be created by pushing a softened optical film through a contoured opening.

Injection molding is a manufacturing process for producing parts by injecting material into a mold. Material for the part is fed into a heated barrel, mixed, and forced into a mold cavity, where it cools and hardens to the configuration of the cavity. For optical plastic films, whether it is an extrusion or injection method, heat is needed to soften the plastic films so they can be shaped curvaceously. Since dyes are sensitive to heat, some dye degradation occurs, and the effectiveness of eye protection reduces.

Another problem with these IR or visible coated lens is that they are easily scratched and are not resistant to chemicals or elements. Over time the protection layers lose their effectiveness and become harmful if not detected and replaced. To overcome this problem lens manufacturers have put another protection layer on top of the IR/visible layer either by spraying, dipping, or injection. However, as a consequence, additional layers make the lens thicker and to have a minimum thickness, which is a barrier for eyewear design and comfort.

Furthermore, traditional coating methods by injection or extrusion methods are aesthetically less appealing because infrared dye appears green in such a coating. In order to counteract or offset the undesirable green color, gray colors may be added to the PVA film. The addition of such gray colors, however, reduces the penetration of light, and therefore the visibility for the viewers, significantly. Finally, the addition of the gray colors to the PVA films on the lens results in higher costs for the lenses, and thus higher costs for the end products. Therefore, material and manufacturing processes for IR absorbing lenses that are inexpensive and quick are desirable.

Recently, to overcome the drawbacks of extrusion and injection methods, solution casting method has been invented and preferred. This manufacturing technology is unique in that the process does not require conventional extrusion or injection molding technologies, yet it readily incorporates components and features traditionally produced by these processes. This method utilizes a mandrel, or inner diameter mold, that is immersed in a tank of polymer solution or liquid plastic that has been specifically engineered for the process. Due to a combination of thermal and frictional properties, the polymer solution then forms a thin film around the mold. The mold is then extracted from the tank in a precisely controlled manner, followed by a curing or drying process.

Other casting devices being used in a solution casting method are a belt or drum machines. Typically, supporting belts are 1.0 to 2.0 m wide and 10 to 100 m long. Stainless steel belts are between 1.0 and 2.0 mm thick. Drums are typically 4 to 8 m in diameter and 1.20 to 1.50 m wide. The belt channel allows a stream of air to flow in machine direction or counter direction. The drum is tightly sealed to prevent vapor emissions and to direct the air stream against the direction of drum movement. One of the two pulleys or drums is connected to a drive that requires extremely accurate speed control to avoid even slight speed variations. One drum is connected to a servo system that adjusts belt tension in order to ensure constant flatness and "absence" of belt movements (vibrations) in the critical area just behind the caster, and to control the expansion and dilatation of the belt length caused by temperature changes. Belt machines have a guide system to avoid belt shifting during operation. The belt is guided by horizontal movements of the support drums. Many different support materials have been used for belts: Copper, silver-plated copper, chromium-plated steel, stainless steel, metal coated with polyvinylalcohol or gelatin, polyester film, PTFE film and other polymer films. At present the commonest support materials are stainless steel and chromium-plated surfaces. Important items for belt and drum machines are the material's heat conductivity, the technical processes used to create the required surface finish and the options for repairing small surface defects. This cast technique permits simple production of films with structured surfaces. The belt surface is clearly and accurately replicated on one surface of the film. The techniques used to adapt the surface of the drums or belts to highly glossy, structured or matt film finishes are proprietary methods.

Once the first layer of thin film is appropriately solidified, secondary features can be added to the product such as braided or coiled wire, laser-cut hypotubes or engineered metal reinforcements to prevent kinking, or imaging targets specific to the intended medical application. Multiple casting steps can then be repeated to encapsulate the reinforcements, build up wall thickness, add additional lumens and optimize column strength. The part is then removed from the mold after it is cured or solidified. This method works with liquid forms of solvent polymers without using excessive heat to cure the part. Since this method uses centrifugal force to shape the part, with the right liquidity ratio, a very thin layer of IR or visible dye solution can be added to an optical film without using excessive heat.

Another method to make the film is a static method such as cavity mold or plate casting or other similar method.

OBJECT OF THE INVENTION

Accordingly, it is the object of this invention to provide a method and system for manufacturing functional films.

It is also the object of the present invention to make optical films that have maximum optical purity and extremely low haze, using readily incorporated mixture components.

It is also the object of the present invention to make virtually isotropic functional films that have excellent flatness and dimensional stability.

It is also the object of the present invention to make functional films with absorbing dye soluble and offers more precision.

It is also the object of the present invention to make functional films without damaging or degrading heat-sensitive dyes.

It is also the object of the present invention to make dyed functional films without an additional liquid coated layer, thus no protection layer is exposed to scratches or chemicals or elements, or can add extra coating the IR protection layer.

It is also the object of the present invention to manufacture functional films that have less treatment, less layers, less defect, and less delamination, and save process time.

It is also the object of the present invention to manufacture functional films that are easily processed, have better quality and good function.

SUMMARY OF INVENTION

A method to make a dyed functional film comprising the steps of: providing a soluble polymer material, PVA powder, or PVA material; adding a solvent or water to the polymer material, PVA powder, or PVA material to make a soluble polymer or PVA solution; providing a soluble dye; adding a solvent to the IR and/or laser dye, photochromic, visible dye to make a soluble dye solution; adding the dye solution to the polymer or PVA solution; introducing the dyed polymer or PVA solution to a solution casting device; letting the solution casting device make a thin dyed functional film from the dyed polymer or PVA solution; removing the thin dyed functional film from the casting device; letting the film dry and solidified;

In one embodiment, the dyed functional film is dried in a temperature between 40-100° C. In another embodiment, the dyed functional film thickness is between 0.0025 mm-2.0 mm.

In one aspect of the invention, a method to manufacture a functional film is disclosed which comprises the steps of: providing a soluble polymer or a PVA material; adding a polymer solvent to the polymer or the PVA material to make a soluble polymer solution or a PVA solution; providing a soluble dye; adding a dye solvent to the soluble dye to make a soluble dye solution; adding the dye solution to the polymer solution or the PVA solution thereby making a dyed polymer solution or a dyed PVA solution; introducing the dyed polymer solution or the dyed PVA solution to a solution casting device; allowing the solution casting device to make a thin dyed optical film from the dyed polymer solution or the dyed PVA solution; removing the thin dyed optical film from the device; allowing the thin dyed optical film to dry and to solidify. In one embodiment, the dyed optical film is dried in a temperature between 40-100° C. In one embodiment, the dyed optical film thickness is between 0.0025 mm-2.0 mm. In one embodiment, the polymer is selected from a group consisting of TAC, Cellulose acetate, Polyamide, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, the thin dyed optical film is capable to function as an eyewear lens, a vehicle window, a camera lens, a microscope lens, a building window, an electronic screen or a lamp cover protection. In one embodiment, the thin dyed optical film is laminated to a glass lens or a plastic lens. In one embodiment, a vacuum coating is applied to the thin dyed optical film. In one embodiment, an anti-Reflective coating is applied to the thin dyed optical film. In one embodiment, a hard coating is applied to the thin dyed optical film. In one embodiment, a water resistant coating is applied to the thin dyed optical film. In one embodiment, a scratch resistant coating is applied to the thin dyed optical film. In one embodiment, the thin dyed optical film is stretched to become a PVA polarized film. In one embodiment, the soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores or similar dye.

In another aspect of the invention, a method to manufacture a functional film is disclosed which is comprising the steps of: providing a soluble polymer; adding a polymer solvent to the a soluble polymer to make a soluble polymer solution; providing a soluble dye; adding a portion of PVA material to the soluble polymer solution; adding a dye solvent to the soluble dye to make a soluble dye solution; adding the dye solution to the polymer solution thereby making a dyed polymer solution; introducing the dyed polymer solution to a solution casting device; allowing the solution casting device to make a thin dyed optical film from the dyed polymer solution; removing the thin dyed optical film from the device; allowing the thin dyed optical film to dry and to solidify.

In another aspect of the invention, an eyewear lens comprising a thin dyed optical film is disclosed wherein the thin dyed optical film is made with a portion of dyed polymer solution in a solution casting device wherein the dyed polymer solution is comprised of a portion of soluble dye solution and a portion of soluble polymer solution wherein the soluble dye solution is comprised of a portion of soluble dye and a portion of dye solvent and wherein the soluble polymer solution is comprised of a portion of polymer solvent and a portion of soluble polymer.

In another aspect of the invention, an eyewear lens comprising a thin dyed optical film wherein the thin dyed optical film is made with a portion of dyed PVA solution in a solution casting device wherein the dyed PVA solution is comprised of a portion of soluble dye solution and a portion of soluble PVA solution wherein the soluble dye solution is comprised of a portion of soluble dye and a portion of dye solvent and wherein the soluble PVA solution is comprised of a portion of polymer solvent and a portion of PVA material. In one embodiment, the soluble polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride. In embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores.

In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water. In one embodiment, soluble dye is selected from a group consisting of an IR dye, a visible dye, a photochromic dye, or an absorbing dye. In one embodiment, the IR dye is selected from a group consisting of Tetrakis ammonium structure, Iminium phthalocyanines, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines, Water soluble phthalocyanine and/or naphthalocyanine dye chromophores.

In one aspect of the invention, a method to manufacture a functional film is disclosed comprising the steps of: providing a PVA material; adding a portion of water to said PVA material to make a PVA solution; providing a portion of water soluble near infrared dye; adding a portion of water or methanol to said water soluble near infrared dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; allowing said thin dyed optical film to dry and to solidify. In one embodiment, the dyed optical film is dried in a temperature between 40-100° C. In one embodiment, the dyed optical film thickness is between 0.015 mm-3.0 mm. In one embodiment, the water soluble near infrared dye is selected from a group consisting of composition having a chemical formula of $C_{38}H_{46}ClN_2O_6S_2Na$; or $C_{43}H_{47}N_2O_6S_2Na$; or $C_{44}H_{52}N_3O_6S_3Na$; or $C_{38}H_{49}N_3O_6S_4Cl$; $C_{46}H_{51}N_2O_6S_2Cl$; $C_{52}H_{56}N_3O_6S_3Na$. In one embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment. In one embodiment, the thin dyed optical film is laminated to a glass lens or a plastic lens. In one embodiment, a vacuum coating is applied to said thin dyed optical film. In one embodiment, an anti-Reflective coating is applied to said thin dyed optical film. In one embodiment, a hard coating is applied to said thin dyed optical film.

In one embodiment, a water resistant coating is applied to said thin dyed optical film. In one embodiment, a scratch resistant coating is applied to said thin dyed optical film. In one embodiment, the thin dyed optical film is stretched to become a PVA polarized film. In another aspect of the invention, an eyewear lens comprising a thin dyed optical film is disclosed wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble infrared dye and a portion of water and wherein said PVA solution is comprised of a portion of water and a portion of PVA material. In another embodiment, the water soluble near infrared dye is selected from a group consisting of composition having a chemical formula of $C_{38}H_{46}ClN_2O_6S_2Na$; or $C_{43}H_{47}N_2O_6S_2Na$; or $C_{44}H_{52}N_3O_6S_3Na$; or $C_{38}H_{49}N_3O_6S_4Cl$; $C_{46}H_{51}N_2O_6S_2Cl$; $C_{52}H_{56}N_3O_6S_3Na$. A method to manufacture a functional film comprising the steps of: providing a PVA material; adding a portion of water to said PVA material to make a PVA solution; providing a portion of water soluble near infrared dye; adding a portion of water or methanol to said water soluble near infrared dye to make a dye solution; adding said dye solution to said PVA solution thereby making a dyed PVA solution; introducing said dyed PVA solution to a solution casting device; allowing said solution casting device to make a thin dyed optical film from said dyed PVA solution; removing said thin dyed optical film from said device; allowing said thin dyed optical film to dry and to solidify. In another embodiment, the dyed optical film is dried in a temperature between 40-100° C. In another embodiment, the dyed optical film thickness is between 0.015 mm-3.0 mm. In another embodiment, the portion of water soluble near infrared dye is selected from a group consisting of composition having a chemical formula of $C_{38}H_{46}ClN_2O_6S_2Na$; or $C_{43}H_{47}N_2O_6S_2Na$; or $C_{44}H_{52}N_3O_6S_3Na$; or $C_{38}H_{49}N_3O_6S_4Cl$; $C_{46}H_{51}N_2O_6S_2Cl$; $C_{52}H_{56}N_3O_6S_3Na$.

In another embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment. In another embodiment, the thin dyed optical film is laminated to a glass lens or a plastic lens. In another embodiment, the vacuum coating is applied to said thin dyed optical film. In another embodiment, an anti-Reflective coating is applied to said thin dyed optical film.

In another embodiment, a hard coating is applied to said thin dyed optical film. In another embodiment, a water resistant coating is applied to said thin dye optical film. In another embodiment, a scratch resistant coating is applied to said thin dyed optical film. In another embodiment, the thin dyed optical film is stretched to become a PVA polarized film. In another aspect of the invention, an eyewear lens comprising a thin dyed optical film wherein said thin dyed optical film is made with a portion of dyed PVA solution in a solution casting device wherein said dyed PVA solution is comprised of a portion of dye solution and a portion of PVA solution wherein said dye solution is comprised of a portion of water soluble infrared dye and a portion of water and wherein said PVA solution is comprised of a portion of water and a portion of PVA material. In another embodiment, the water soluble near infrared dye is selected from a group consisting of composition having a chemical formula of $C_{38}H_{46}ClN_2O_6S_2Na$; or $C_{43}H_{47}N_2O_6S_2Na$; or $C_{44}H_{52}N_3O_6S_3Na$; or $C_{38}H_{49}N_3O_6S_4Cl$; $C_{46}H_{51}N_2O_6S_2Cl$; $C_{52}H_{56}N_3O_6S_3Na$.

In another aspect of the invention, a method to manufacture a functional film is disclosed comprising the steps of: providing a soluble polymer; adding a polymer solvent to said polymer to make a soluble polymer solution, providing a soluble dye; adding a dye solvent to said soluble dye to make a soluble dye solution; adding said dye solution to said polymer solution thereby making a dyed polymer solution; introducing said dyed polymer solution a solution casting device; allowing said solution casting device to make a thin dyed optical film from said dyed polymer solution; removing said thin dyed optical film from said device; allowing said thin dyed optical film to dry and to solidify. In one embodiment, the dyed optical film is dried in a temperature between 40-150° C. In one embodiment, the dyed optical film thickness is between 0.015 mm-3.0 mm. In one embodiment, the polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride, Polyox (Ethylene Oxide), etc., is added to an appropriate solvent, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Alcohol, phenol, o-chlorophenol, DMSO, trifluoroacetic acid (either pure or as mixtures with dichloromethane), 1,1,1,3,3,3-Hexafluoro-2-propanol, o-chlorophenol, o-cresol, tetrachloroethane/phenol, Dichloromethane (DCM) with a small amount of dioxane, nitrobenzene, etc. In one embodiment, the polymer solvent is selected from a group consisting of triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLOHEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Alcohol, phenol, o-chlorophenol, DMSO, trifluoroacetic acid (either pure or as mixtures with dichloromethane), 1,1,1,3,3,3-Hexafluoro-2-propanol, o-chlorophenol, o-cresol, tetrachloroethane/phenol, Dichloromethane (DCM) with a small amount of dioxane, nitrobenzene, etc. In one embodiment, the thin dyed optical film is laminated to a glass lens or sheet, or a plastic lens or sheet wherein said laminated lens forms at least one layer and is thereafter subject to a process of bending or a process of co-injection. In one embodiment, the soluble dye is selected from a group consisting of an IR dye, a visible dye, a photochromic dye, or an absorbing dye. In one embodiment, a vacuum coating is applied to said thin dyed optical film. In one embodiment, an anti-Reflective coating is applied to said thin dyed optical film. In one embodiment, a hard coating is applied to said thin dyed optical film. In one embodiment, a water resistant coating is applied to said thin dyed optical film. In one embodiment, a scratch resistant coating is applied to said thin dyed optical film. In one embodiment, the thin dyed optical film is capable to function as an eyewear lens, a vehicle window, a camera lens, a microscope lens, a building window, an electronic screen, a lamp cover protection, a phone screen, a TV screen, a computer screen or an appliance equipment.

In one aspect of the invention, a method to manufacture a water base functional film comprising the steps of: providing a PVA material; adding a portion of water to said PVA material to make a PVA solution; providing a portion of water soluble infrared dye wherein said portion of water soluble infrared dye is selected from a group consisting of composition having a chemical formula of $C_{38}H_{46}ClN_2O_6S_2Na$; or $C_{43}H_{47}N_2O_6S_2Na$; Or $C_{44}H_{52}N_3O_6S_3Na$; Or $C_{38}H_{49}N_3O_6S_4Cl$, $C_{46}H_{51}N_2O_6S_2Cl$; $C_{52}H_{56}N_3O_6S_3Na$; cyanine dye; amino group; vinylic chlorine atom; carboxyl group; croconium dye; adding a portion of water or methanol to said water soluble infrared dye to make an IR dye solution; adding said IR dye solution to said PVA solution thereby making an IR dyed PVA solution; introducing said IR dyed PVA solution to a solution casting device; allowing said solution casting device to make a thin IR dyed optical film from said IR dyed PVA solution; allowing said thin IR dyed optical film to dry and to solidify; removing said thin IR dyed optical film from said device; mounting untreated thin IR dyed optical film at beginning of assembly line; using water to wet, clean and wash the film in first water tank until the film attains approximately 60% to 85% water saturation; dipping and stretching the film in a second tank containing 0.3% to 3% dichroic dyes and/or 0.06% to 1% iodine and/or 0.01% to 1% boric acid; stretching the film from through said first and said second tank at a temperature of 20° C. to 50° C. with a rolling speed 1 to 2.5 meters per minute; cleaning and stretching the film in a third water tank wherein said thin IR dyed optical film is processed to become an IR PVA polarized film.

In one embodiment, the thin IR dyed optical film is dried in a temperature between 40-150° C. In one embodiment, the thin IR dyed optical film thickness is between 0.015 mm-3.0 mm. In one embodiment, the thin IR dyed optical film is capable to function as an eyewear lens, a vehicle window, a camera lens, a microscope lens, a building window, an electronic screen, a lamp cover protection, a phone screen, a TV screen, a computer screen, or tent. In one embodiment, the thin IR dyed optical film can be laminated or cast to glass lens, plastic lens, sheet wherein said laminated lens forms at least one layer and is thereafter subject to a process of bending, co-injection or as it is. In one embodiment, the thin IR dyed Polarized optical film is further laminated to a PVA polarized film or a PET polarized film or non-Polarized film. In one embodiment, make PVA solution can add Dimethylsulfoxide (DMSO), Glycerol, Styrene-acrylic, pure acrylic emulsion, rosin plasitc sizing agent and other additives to help the solution easier form as desired film. In one embodiment, the IR PVA polarized film can be treated with selected Silance coupling agent, Acetone, Diisocyanate-based, and/or aliphatic alcohol by spray, dipping, coating or flowing methods to increase water resistance. In one embodiment, the IR dyed optical film becomes an IR PVA polarized film, can be laminated to additional IR functional film to increase IR absorption.

In another aspect of the invention, a method to manufacture a water base functional film comprising the steps of: providing a PVA material; adding a portion of water to said PVA material to make a PVA solution; introducing said PVA solution to a solution casting device; allowing said solution casting device to make a thin dyed optical film from said PVA solution; allowing said thin optical film to dry and to solidify; removing said thin optical film from said device; mounting untreated thin optical film at beginning of assembly line; using water to wet, clean and wash the film in first water tank until the film attains approximately 60% to 85% water saturation; preparing an IR dye solution; dipping and stretching the film in a second tank containing 0.3% to 3% dichroic dyes and/or 0.06% to 1% iodine and/or 0.01% to 1% boric acid and said IR dye solution; stretching the film from through said first and said second tank at a temperature of 20° C. to 50° C. with a rolling speed 1 to 2.5 meters per minute; cleaning and stretching the film in a third water tank wherein said thin IR dyed optical film is processed to become an IR PVA polarized film.

In another aspect of the invention, a method to manufacture an oil base functional film is disclosed comprising the steps of: providing a soluble polymer; adding a polymer solvent to said polymer to make a soluble polymer solution; providing an IR oil base soluble dye; adding a dye solvent to said IR oil based soluble dye to make an IR soluble dye solution; adding said IR dye solution to said polymer solution thereby making an IR dyed polymer solution; introducing said IR dyed polymer solution into a solution casting device; allowing said solution casting device to make a thin IR dyed optical film from said IR dyed polymer solution; removing said thin IR dyed optical film from said device; wherein said IR oil base soluble dye is selected from a group consisting of: Tetrakis ammonium structure, naphthalocyanines, metal complexes, azo dyes, anthraquinones, quadratic acid derivatives, immonium dyes, perylenes Dianthrones Cyanines Heteroaromatics Metal Dithiolenes Oxadiazoles Phthalocyanines Spiropyra Tetraaryldiamines Triarylamines; diimmonium; polymethine-based dye; squarylium-based; indoaniline; sub-ammonium-based pigment; anionic compound; scare morpholino dyes: inorganic oxide; wherein said soluble polymer is selected from a group consisting of TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride, Polyox, Nylon, propelty modified Nylon; allowing said thin IR dyed optical film to dry and to solidify; wherein said thin IR dyed optical film is further laminated to a PVA polarized film or a PET polarized film, Non-Polarized film or additional IR functional film to increase IR absorption.

In one embodiment, the IR dyed optical film is dried in a temperature between 40-150° C. In one embodiment, the IR dyed optical film thickness is between 0.015 mm-3.0 mm In one embodiment, the thin IR dyed optical film is laminated or cast to a glass lens or sheet, or a plastic lens or sheet wherein said laminated lens forms at least one layer and is thereafter subject to a process of bending, co-injection or as it is. In one embodiment, thin IR dyed optical film is capable to function as functional film for a lens wherein the lens is selected from a group consisting of an eyewear lens, or a vehicle window, or a camera lens, or a microscope lens, pr a building window, or an electronic screen, or a lamp cover protection, or a phone screen, or a TV screen, or a computer screen or tent.

In another aspect of the invention, a method to manufacture an oil base functional film is disclosed comprising the steps of: providing a soluble polymer; adding a polymer solvent to said polymer to make a soluble polymer solution; providing an IR oil base soluble dye; adding a dye solvent to said IR oil based soluble dye to make an IR soluble dye solution; adding said IR dye solution to said polymer solution thereby making an IR dyed polymer solution; preparing a device with Polarized or Non-Polarized plastic film or sheet. Casting, spraying, coating, or flowing the said IR dyed polymer solution on to the plastic film or sheet to make a thin IR dyed Polarized optical film or thin IR dyed non-Polarized optical film. Allowing said thin optical film to dry and to solidify; removing said thin optical from the device.

BRIEF DESCRIPTION OF THE DRAWINGS

These and other features and advantages of the invention will not be described with reference to the drawings of certain preferred embodiments, which are intended to illustrate and not to limit the invention, and in which.

DETAILED DESCRIPTION OF THE INVENTION

Some embodiments are described in detail with reference to the related drawings. Additional embodiments, features, and/or advantages will become apparent from the ensuing description or may be learned by practicing the invention. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed. It should be noted that references to "an" or "one" or "some" embodiment(s) in this disclosure are not necessarily to the same embodiment, and such references mean at least one.

In accordance with the practice of the present invention, the methods and system of making a functional film disclosed herein provides many important advantages over those of prior arts. Specifically, the current invention yields a virtually isotropic, flat, and dimensionally stable functional film. Furthermore, the functional film achieves maximum optical purity and extremely low haze. The film is also dyed to a precise specification without affected by dye degradation problem. As a result, the present functional film has less treatment, less defect, less delamination, and less stress, and, thus, the optical lens requires fewer layers, and process time is shorter. Although yielding many advantages, the current method uses readily incorporated mixture components used in the traditional methods. The current invention does not increase material costs, and, in certain cases, it actually reduces material costs because it yields accurate optical properties/specification, and thinness functional films, which in turn reduce the number of layers in an optical lens.

Figure 1:
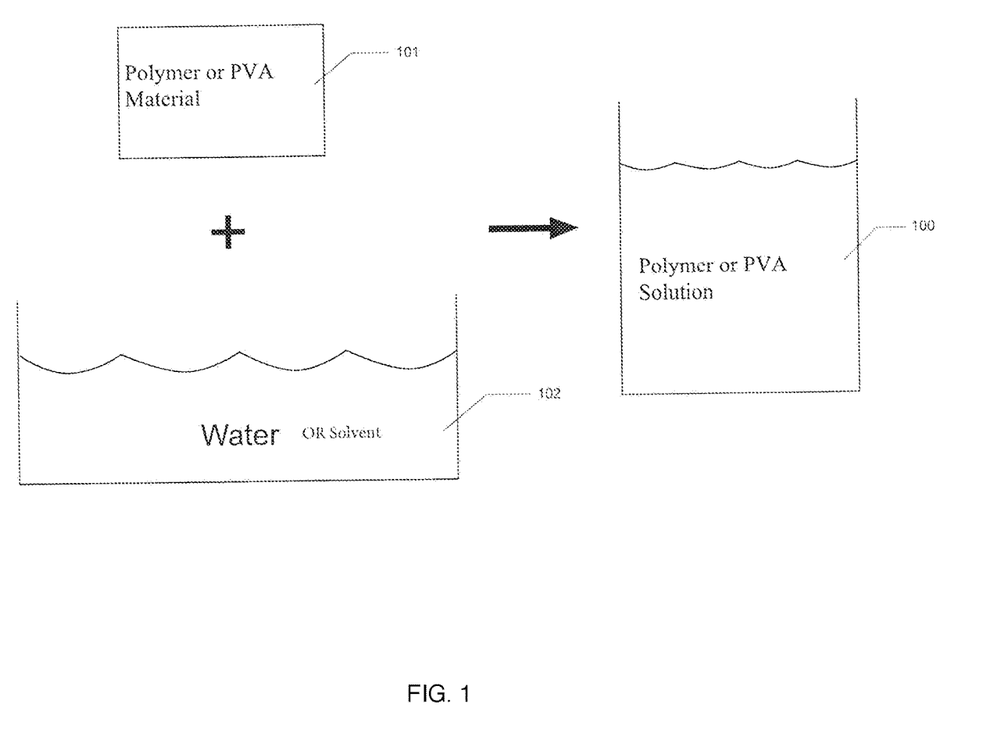
FIG. 1 is an illustrative view of the preparation of a polymer or PVA solution in a preferred solvent or water.

Referring to FIG. 1, a plastic polymer 101, such as TAC, Polyamide, Cellulose acetate, Cellulose propionate, Polyurethane, PVC, Silicon urethane copolymer, Acrylic, COP, Tetrafluoroethylene polymer, PC, PP, PE, Polyethersulfon, Polyetherimide, Polyvinylidene fluoride, etc., is added to an appropriate solvent 102, such as water, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLO-HEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a plastic polymer, such as TAC, Cellulose acetate, Cellulose propionate, Polyurethane, PVC, Silicon urethane copolymer, Acrylic, COP, Tetrafluoroethylene polymer, PC, PP, PE, PET, Polyethersulfon, Polyetherimide, Polyvinylidene fluoride is added to an appropriate solvent 102, such as, triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLO-HEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, Polyvinyl Alcohol, etc., to make the first solution 100, liquid A, a plastic polymer.

In another embodiment, a PVA material 101 is added to an appropriate solvent 102, such as water to form PVA solution.

Figure 2:
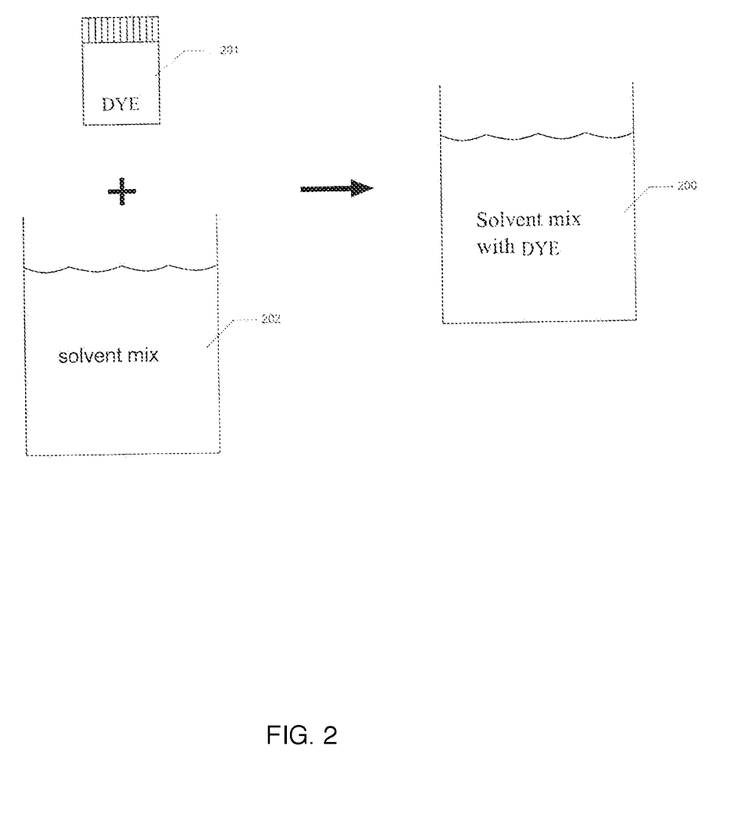
FIG. 2 is an illustrative view of the preparation of an IR dye and/or laser dye, photochromic, visible dye solution in a preferred solvent or water.

Referring to FIG. 2, a dye 201 such as IR and/or visible dye, photochromic dye, or any absorbing dyes, is added to an appropriate solvent 202 such as triphenyl phosphate, diphenyl phosphate, dichloromethane, methanol, resorcinol, tetraphenyl diphosphate, acetone, butanol, butyl acetate, butanol, Biphenyl diphenyl phosphate, Trichloromethane, MEK, EAC, IPA, MIBK, BCS, MCS, EAC, BAC, CYCLO-HEXANONE, Tetrahydrofuran, Ether, Esters, Polyimides, Dimethylformamide, Polyvinylalcohol, Methyl Cellulose, Starch derivatives, Gelatine, Methyl-ethylketon, Tetrahydrofuran, Methylene Chloride, water, etc., to make the second solution 200, liquid B, a dye solution.

In another embodiment, a water based dye 201 such as water soluble near infrared dye is added to an appropriate solvent 202 such as water or methanol to form a water soluble dye solution. In one embodiment, the water soluble near infrared dye is a composition having a chemical formula of $C_{38}H_{46}Cl\ N_2O_6S_2Na$; or $C_{43}H_{47}N_2O_6S_2Na$; or $C_{44}H_{52}N_3O_6S_3Na$; or $C_{38}H_{49}N_3O_6S_4Cl$; $C_{46}H_{51}N_2O_6S_2Cl$; $C_{52}H_{56}N_3O_6S_3Na$. In another embodiment, the water soluble near infrared dye is a near infrared fluorescent dye. In another embodiment, the water soluble near infrared dye is a Epolight™ 2735 water soluble dye.

Figure 3:
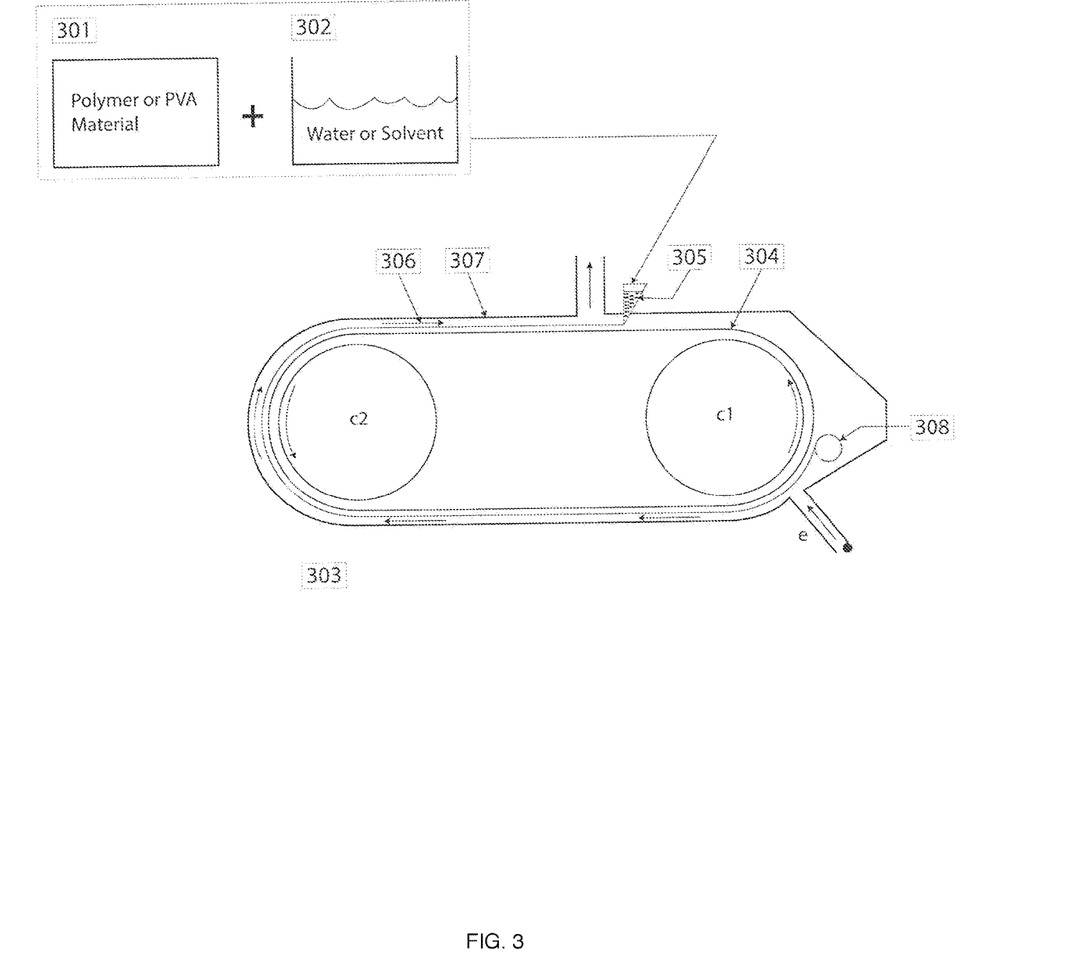
FIG. 3 is an illustrative view of a typical solution casting method and apparatus.

Referring to FIG. 3, the polymer casting method used in this invention is depicted. Polymer material, PVA powder, or PVA material 301 is mixed with a solvent 302. In one embodiment, low heat under 100° C. may be used to speed up the dissolving of the polymer in the solvent. However, in another embodiment, other polymer materials, such as TAC, may not need any heat to dissolve. The solution may be further processed to arrive at the required solution for making a functional film with certain optical properties. The final polymer or PVA solution is then introduced to the casting device 303 as depicted. In one embodiment, the final polymer or PVA solution is deposited onto a moving belt 304 through a caster or spreader 305. The polymer or PVA solution is dried and solidified by a stream of air 306 flowing in a belt channel 307 against the direction of the moving belt. It is appreciated that in other embodiments the stream of air 306 may flow in the direction of the moving belt. It is also appreciated that dry air, its direction, belt speed, space of the belt channel, etc. are calibrated such that the functional film achieve a desired thickness, dryness, and other qualities. Moreover, by the time the functional film reaches the film take-off 308 the input polymer or PVA solution must be solidified enough to be taken off the belt for further drying or processing.

Figure 4:
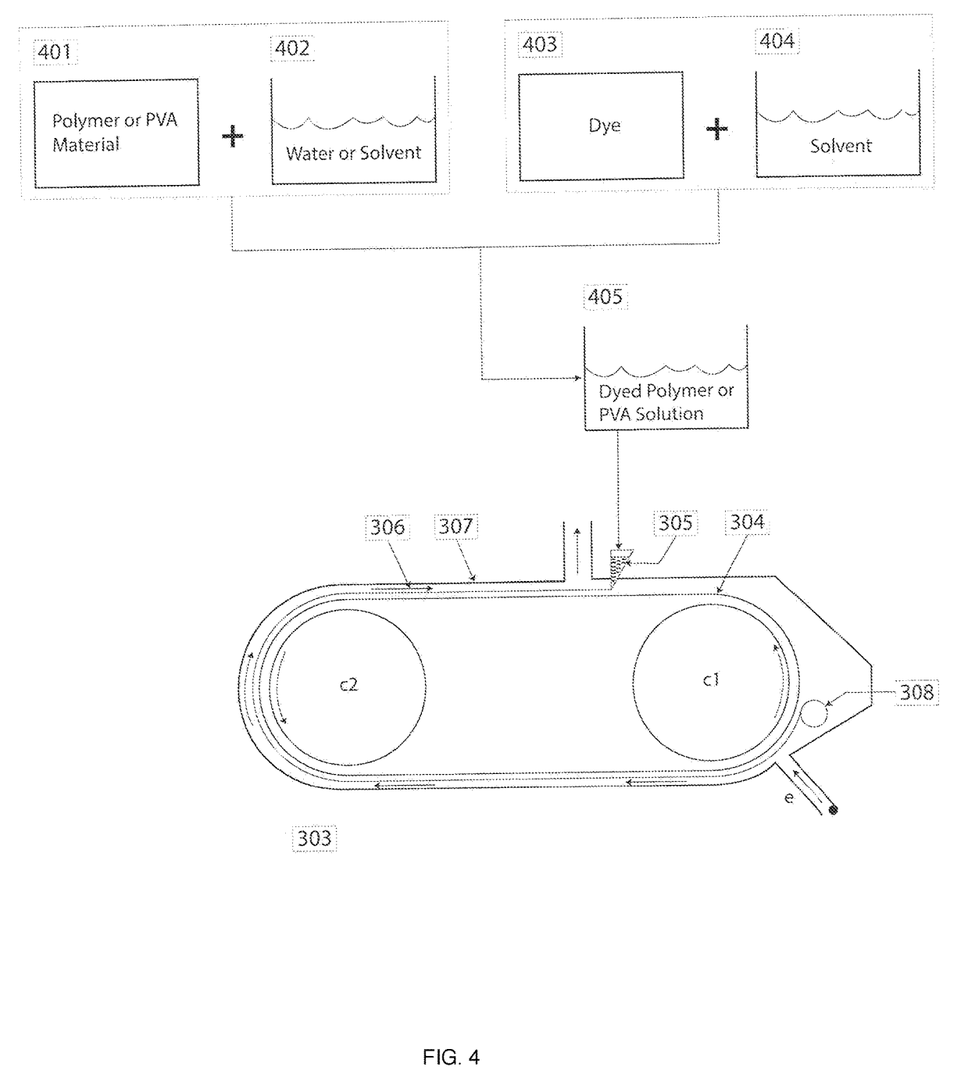
FIG. 4 is an illustrative view of the process of making a functional film using Solution Casting Method.

Referring to FIG. 4, the casting method as depicted in FIG. 3 is adapted for this invention. A liquid A, a polymer solution is made by adding a polymer material 401 to an appropriate solvent 402. Liquid B, a dye solution, is made adding a dye 403, which can be IR or visible dye, photochromic dye, or any absorbing dyes, to an appropriate solvent 404. In one embodiment, the Liquid B is comprised of between 0.05% to 5% of IR or visible dye, or photochromic dye or absorbing dye and the rest being in appropriate solvent. In one embodiment, the preferred embodiment is Liquid B comprising 3% of the dye. The resulting solutions are mixed together to make dyed polymer solution 405. In one embodiment, water soluble PVA (polyvinyl alcohol) with IR dye may also contain s water soluble near infrared dye and the rest being in appropriate water or methanol. In one embodiment, the preferred embodiment is Liquid B comprising 3% of the dye. The resulting solutions are mixed together to make dyed PVA solution 405.

The dyed PVA solution or dyed polymer solution 405 is next introduced into a solution casting device 406. This device would utilize a large belt 407 whose material and design are made appropriate for a desired functional film. In a preferred embodiment, the film is introduced to a dry environment where the temperature is between 40-150° C. The functional film is continuously taken off the moving belt for further drying, processing, rolled or sheeted. It is then used to produce an eyewear lens, camera lens, microscope lens, car windows, building windows, electronic screen, lamp cover protection, etc. In a preferred embodiment, the functional film thickness is between 0.015 mm-3.0 mm Different films with different optical properties can be laminated together to obtain the desired eyewear lens, camera lens, microscope lens, car windows, building windows, electronic screen, lamp cover protection, etc.

Figure 5:
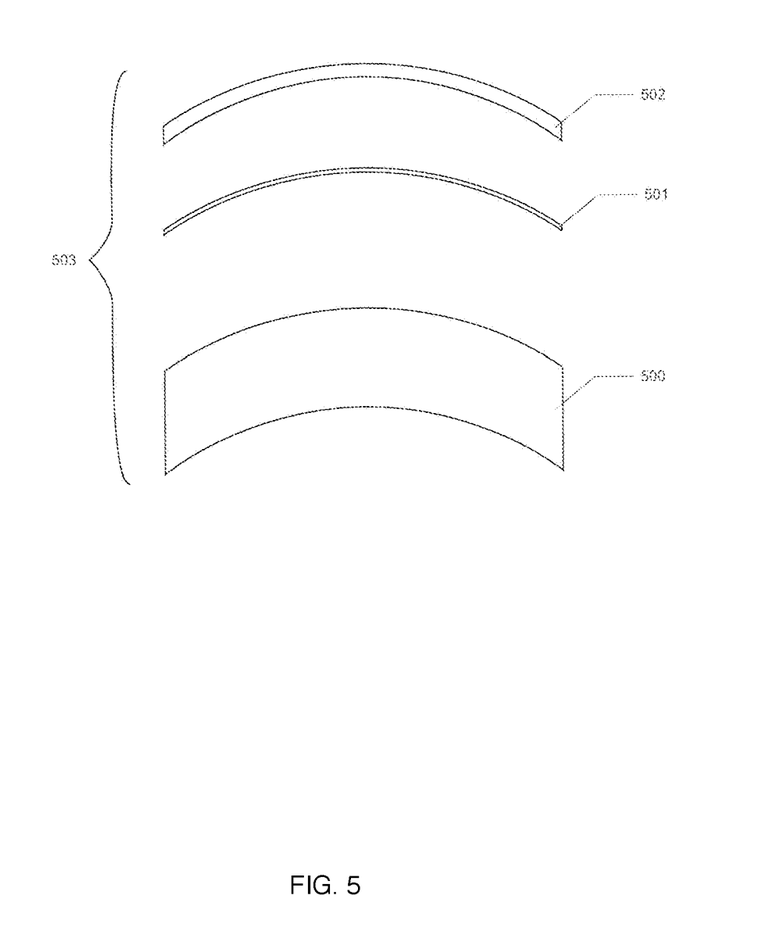
FIG. 5 is an illustrative view of laminating a new functional film as an optical component with other materials to make an eyewear optical lens, camera lens, microscope lens, car windows, building windows, electronic screen, lamp cover protection, etc.

In one embodiment, referring to FIG. 5, a curved lens 503 is made wherein visible and/or IR dyed optical film 501, which is made using the present method as depicted in FIG. 3, is laminated on another clear film or glass 500, which has certain optical properties. Another scratch-resistant optical glass 502 is laminated on top of the dyed functional film 501 to protect the IR/visible layer from scratches, chemicals, and/or the elements. In one embodiment, the process of making a functional film that can use multi-head flow machine to cast the materials, use different dyes, materials, or have different formats. In another embodiment, while the functional film is made, it can be stretched to get orientation. In another embodiment, the functional film has a physical characteristic of absorbing or reflecting 90% or more lights with wave lengths of 400-430 nm, and more than 37% lights with wave lengths of 760-2000 nm. In one embodiment, after the functional film is made using the adapted solution casting method, the functional film is formed to the curvature of the final product, and may further be bound with an epoxy layer by injection molding. In another embodiment, the functional film is further laminated to another PVA film as an additional layer. This process can be repeated for multiple layers of PVA films to achieve the intended product design. It is appreciated that different functional films can also be laminated together to achieve certain optical properties. In one embodiment, Solution casting method using single layer of function film or extra laminate (one or more layers of function film), may also make desired shape or curve to put in mold for co-injection substrate (main support material).

In one embodiment, the functional film can be laminated on top or bottom of, or in between any types of glass, plastic and/or metal objects. In one embodiment, the functional film can be formed into any geometry shapes, or casting molds to achieve an intended design. In one embodiment, PVA water solution material is used as its own polarized and/or an additional polarized layer is laminated.

Figure 6:
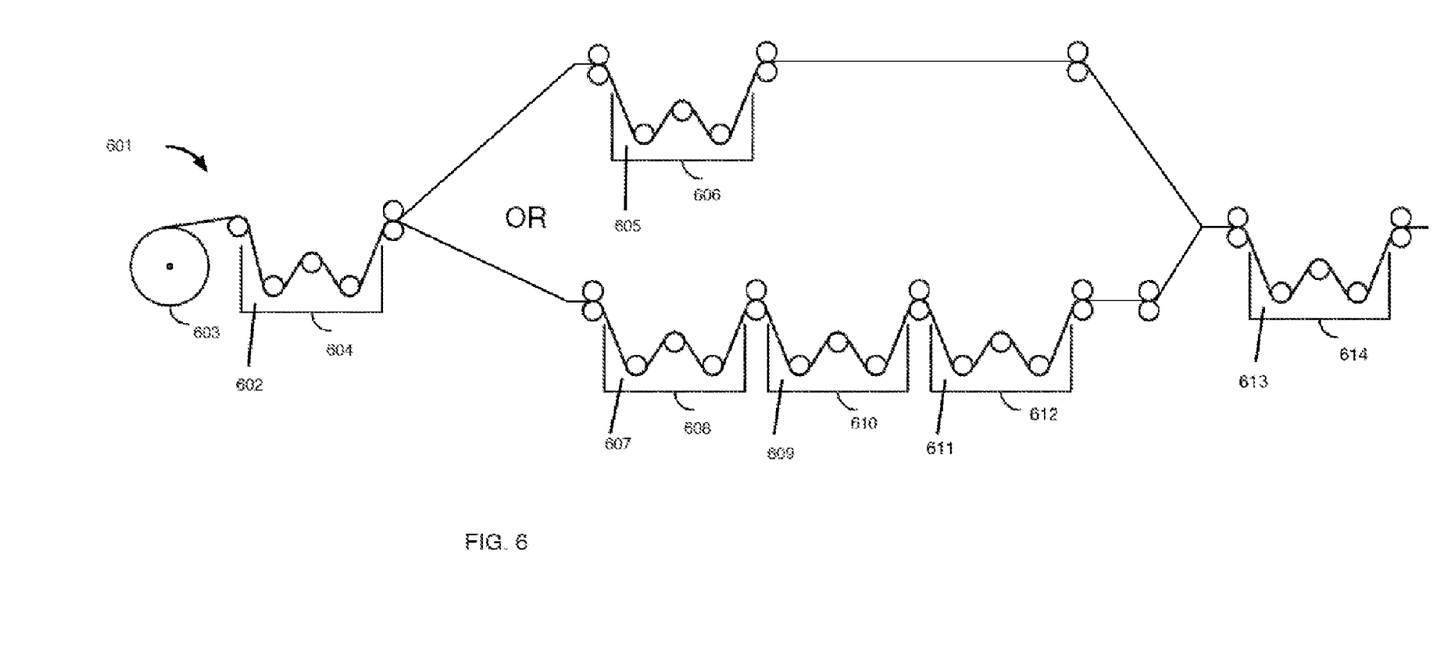
FIG. 6 is another embodiment of the present invention.

Referring to FIG. 6, in one aspect of the invention, a method to manufacture a water base functional film comprising the steps of: providing a PVA material; adding a portion of water to said PVA material to make a PVA solution; providing a portion of water soluble near infrared dye wherein said portion of water soluble near infrared dye is selected from a group consisting of composition having a chemical formula of $C_{38}H_{46}ClN_2O_6S_2Na$; or $C_{43}H_{47}N_2O_6S_2Na$; Or $C_{44}H_{52}N_3O_6S_3Na$; Or $C_{38}H_{49}N_3O_6S_4Cl$, $C_{46}H_{51}N_2O_6S_2Cl$; $C_{52}H_{56}N_3O_6S_3Na$; cyanine dye; amino group; vinylic chlorine atom; carboxyl group; croconium dye; adding a portion of water and/or methanol to said water soluble near infrared dye to make a IR dye solution; adding said IR dye solution to said PVA solution thereby making an IR dyed PVA solution; introducing said IR dyed PVA solution to a solution casting device; allowing said solution casting device to make a thin IR dyed optical film from said IR dyed PVA solution; allowing said thin IR dyed optical film to dry and to solidify.

Afterwards, removing said thin IR dyed optical film from said device; mounting untreated thin IR dyed optical film at beginning of assembly line 601. Referring to FIG. 6, water 602 is used to wet, clean and wash the film 603 in first water tank 604 until the film attains approximately 60% to 85% water saturation; dipping and stretching the film 603 (1) in a second tank 606 containing portion of solution of 0.3% to 3% dichroic dyes with a portion of solution of 0.06% to 1% iodine and 0.01% to 1% portion of solution of boric acid 605; or (2) stretching the film 603 in a second tank 608 containing portion of solution of 0.3% to 3% dichroic 607 and continue to stretch the film 603 in a third tank 610 containing portion of solution of 0.06% to 1% iodine 609 and continue to stretch the film 603 in a fourth tank 612 containing portion of solution containing 0.01% to 1% of boric acid 611. In one embodiment, stretching the film through the tanks is controlled at a temperature of 20° C. to 50° C. with a rolling speed 1 to 2.5 meters per minute. In one embodiment, the step further includes cleaning and stretching the film in a final tank 614 with water 613 wherein said thin IR dyed optical film is processed to become an IR PVA polarized film.

In one embodiment, the thin IR dyed optical film is dried in a temperature between 40-150° C. In one embodiment, the thin IR dyed optical film thickness is between 0.015 mm-3.0 mm In one embodiment, the thin IR dyed optical film is capable to function as an eyewear lens, a vehicle window, a camera lens, a microscope lens, a building window, an electronic screen, a lamp cover protection, a phone screen, a TV screen, a computer screen, or tent. In one embodiment, the thin IR dyed optical film can be laminated or cast to glass lens, plastic lens, sheet wherein said laminated lens forms at least one layer and is thereafter subject to a process of bending, co-injection or as it is. In one embodiment, the thin IR dyed Polarized optical film is further laminated to a PVA polarized film or a PET polarized film or non-Polarized film. In one embodiment, make PVA solution can add Dimethylsulfoxide (DMSO), Glycerol, Styrene-acrylic, pure acrylic emulsion, rosin plasitc sizing agent and other additives to help the solution easier form as desired film. In one embodiment, the IR PVA polarized film can be treated with selected Silance coupling agent, Acetone, Diisocyanate-based, and/or aliphatic alcohol by spray, dipping, coating or flowing methods to increase water resistance. In one embodiment, the IR dyed optical film becomes an IR PVA polarized film, can be laminated to additional IR functional film to increase IR absorption.

The invention claimed is:

1. A method to manufacture an eyeglass lens using a water-based functional film, the method comprising the steps of:
    a. providing a polyvinyl alcohol (PVA) material;
    b. adding a portion of water to said PVA material to make a PVA solution;
    c. providing a portion of water soluble near infrared dye wherein said portion of water soluble near infrared dye is selected from a group consisting of composition having a chemical formula of C38H46ClN2O6S2Na, or C43H47N2O6S2Na, or C44H52N3O6S3Na, or C38H49N3O6S4Cl, or C46H5IN2O6S2Cl, or C52H56N3O6S3Na, or cyanine dye, or an amino group, or vinylic chlorine atom, or a carboxyl group, or croconium dye;
    d. adding a portion of water or methanol to said water soluble near infrared (IR) dye to make an IR dye solution;
    e. adding said IR dye solution to said PVA solution thereby making an IR dyed PVA solution;
    f. introducing said IR dyed PVA solution to a solution casting device;
    g. allowing said solution casting device to make a thin IR dyed optical film from said IR dyed PVA solution;
    h. allowing said thin IR dyed optical film to dry and to solidify;
    i. removing said thin IR dyed optical film from said solution casting device;
    j. mounting said thin IR dyed optical film to a surface for treatment;
    k. using water to wet, clean and wash the film in a first water tank until the film attains approximately 60% to 85% water saturation;
    l. dipping and stretching the film in a second tank containing 0.3% to 3% dichroic dyes or 0.06% to 1% iodine or 0.01% to 1% boric acid, or combination thereof, wherein stretching the film occurs at a temperature of 20° C. to 50° C. with a rolling speed of 1 to 2.5 meters per minute;
    m. cleaning and stretching the film in a third water tank wherein said thin IR dyed optical film is processed to form an IR PVA polarized film; and
    n. laminating or casting the IR PVA polarized film to an eyeglass lens blank to make an eyeglass lens,
    wherein the eyeglass lens has an average absorption rate of 37% or more in the IR range of 760-2000 nano meters (nm).

2. The method of claim 1, wherein said thin IR dyed optical film is dried in a temperature between 40-150° C.

3. The method of claim 1, wherein said thin IR dyed optical film thickness is between 0.015 mm-3.0 mm.

4. The method of claim 1, wherein said thin IR dyed polarized optical film is further laminated to a PVA polarized film or a polyethylene terephthalate (PET) polarized film or non-polarized film.

5. The method of claim 1, wherein said PVA solution further comprises one of dichloromethane, glycerol, styrene-acrylic, pure acrylic emulsion, a rosin plastic sizing agent, or other additives to help the solution easier form as desired film.

6. The method of claim 1, further comprising treating said IR PVA polarized film with selected silane coupling agent, acetone, diisocyanate-based polyurethane, or aliphatic alcohol by at least one of a spraying, dipping, coating or flowing methods to increase water resistance.

7. The method of claim 1, further comprising laminating said IR dyed optical film to an IR functional film to increase IR absorption prior to laminating or casting said IR dyed optical film to the eyeglass lens blank.

8. The method of claim 1, further comprising adding visible dye or laser dye to one of said step c or step l to create a colored film.

9. A method to manufacture an eyeglass lens using a water-based functional film, the method comprising the steps of:
    a. providing a polyvinyl alcohol (PVA) material;
    b. adding a portion of water to said PVA material to make a PVA solution;
    c. introducing said PVA solution to a solution casting device;
    d. allowing said solution casting device to make a thin optical film from said PVA solution;
    e. allowing said thin optical film to dry and to solidify;
    f. removing said thin optical film from said device;
    g. mounting said thin optical film to a surface for treatment;
    h. using water to wet, clean and wash the film in a first water tank until the film attains approximately 60% to 85% water saturation;
    i. preparing an IR dye solution;
    j. dipping and stretching the film in a second tank containing 0.3% to 3% dichroic dyes or 0.06% to 1% iodine or 0.01% to 1% boric acid and said IR dye solution, or combination thereof, wherein stretching the film occurs at a temperature of 20° C. to 50° C. with a rolling speed 1 to 2.5 meters per minute;
    k. cleaning and stretching the film in a third water tank wherein said thin optical film is processed to become an infrared (IR) PVA polarized film; and
    l. laminating or casting the IR PVA polarized film to an eyeglass lens blank to make an eyeglass lens,
    wherein the eyeglass lens has an average absorption rate of 37% or more in the IR range of 760-2000 nano meters (nm).

10. A method to manufacture an eyeglass lens using an oil-based functional film, the method comprising the steps of:
    a. providing a soluble polymer selected from a group consisting of cellulose triacetate, cellulose acetate, cellulose propionate, polyurethane, polyvinyl chloride, silicon urethane copolymer, acrylic, cyclic olefin copolymer, tetrafluoroethylene polymer, polyethersulfone, polyetherimide, polyvinylidene fluoride, ethylene oxide polymer, polyethylene oxide polymer, nylon, or properly modified nylon;
b. adding a polymer solvent to said soluble polymer to make a soluble polymer solution;
c. providing an infrared (IR) oil-based soluble dye selected from a group consisting of: tetrakis ammonium structure, naphthalocyanines, metal complexes, azo dyes, anthraquinones, quadratic acid derivatives, immonium dyes, perylenes dianthrones cyanines heteroaromatics metal dithiolenes oxadiazoles phthalocyanines, spiropyra tetraaryldiamines triarylamines, diimmonium, polymethine-based dye, squarylium-based-dye, indoaniline, sub-ammonium-based pigment, anionic compound, scare morpholino dyes, or inorganic oxide;
d. adding a dye solvent to said IR oil-based soluble dye to make an IR soluble dye solution;
e. adding said IR soluble dye solution to said soluble polymer solution thereby making an IR dyed polymer solution;
f. introducing said IR dyed polymer solution into a solution casting device;
g. allowing said solution casting device to make a thin IR dyed optical film from said IR dyed polymer solution;
h. allowing said thin IR dyed optical film to dry and to solidify;
i. removing said thin IR dyed optical film from said device;
j. laminating said thin IR dyed optical film to a polyvinyl alcohol (PVA) polarized film, a polyethylene terephthalate (PET) polarized film, a non-polarized film, or an additional IR functional film to form a laminated film to increase IR absorption;
k. laminating or casting the laminated film to an eyeglass lens blank to make an eyeglass lens,
wherein the eyeglass lens has an average absorption rate of 37% or more in the IR range of 760-2000 nano meters (nm).

11. The method of claim 10, wherein said IR dyed optical film is dried in a temperature between 40-150° C.

12. The method of claim 10, wherein said IR dyed optical film thickness is between 0.015 mm-3.0 mm.

13. The method of claim 10, further comprising adding visible dye or laser dye to said step c to create a colored film.

14. A method to manufacture an eyeglass lens using an oil-based functional film, the method comprising the steps of:
a. providing a soluble polymer;
b. adding a polymer solvent to said soluble polymer to make a soluble polymer solution;
c. providing an infrared (IR) oil-based soluble dye;
d. adding a dye solvent to said IR oil-based soluble dye to make an IR soluble dye solution;
e. adding said IR soluble dye solution to said soluble polymer solution thereby making an IR dyed polymer solution;
f. preparing a device with a polarized or non-polarized plastic film or sheet;
g. casting or coating or spraying or flowing said IR dyed polymer solution on to said plastic film or sheet to become an IR dyed optical film or an IR dyed polarized film;
h. allowing said film to dry and to solidify;
i. removing said film from said device; and
j. laminating or casting the film to an eyeglass lens blank to make an eyeglass lens, wherein the eyeglass lens has an average absorption rate of 37% or more in the IR range of 760-2000 nano meters (nm).

15. A method of manufacturing an eyeglass lens comprising at least one layer that uses a functional film containing photochromic dye or laser dye, the method comprising the steps of:
a. providing a polyvinyl alcohol (PVA) material;
b. adding a portion of water to said PVA material to make a PVA solution;
c. providing a portion of water soluble near-infrared (IR) dye;
d. adding a portion of water or methanol to said water soluble near-infrared dye to make a dye solution;
e. adding said dye solution to said PVA solution thereby making a dyed PVA solution;
f. applying said dyed PVA solution onto a running belt inside a channel;
g. allowing said dyed PVA solution to solidify as a thin optical film on said running belt by supplying air flow inside the channel, and controlling thickness, dryness, and absorption rate of the thin optical film by adjusting a combination of 1) direction of the air flow, 2) belt speed, and 3) space of the belt channel;
h. removing said thin optical film from the running belt;
i. applying a photochromic dye solution or a laser dye solution, or combination thereof, to said thin optical film; and
j. laminating or casting the thin optical film to an eyeglass lens blank to make an eyeglass lens,
wherein the PVA solution has a polymer concentration between 9% and 25%, inclusive;
the dye solution has a dye concentration between 0.05% and 5%, inclusive; the eyeglass lens has an absorption rate in the ultraviolet and infrared frequency range, the absorption rate comprising an average of more than 37% for lights with wavelengths of 760-2000 nm.

16. A method of manufacturing an eyeglass lens comprising at least one layer that uses a functional film containing photochromic dye or laser dye, the method comprising the steps of:
a. providing a soluble polymer;
b. adding a polymer solvent to said polymer to make a soluble polymer solution;
c. providing an infrared (IR) oil-based soluble dye;
d. adding a dye solvent to said IR oil-based soluble dye to make a soluble dye solution;
e. adding said dye solution to said polymer solution thereby making a dyed polymer solution;
f. applying said dyed polymer solution onto a running belt;
g. allowing said dyed polymer solution to solidify as a thin optical film on said running belt;
h. removing said thin optical film from the running belt;
i. applying a photochromic dye solution or a laser dye solution, or combination thereof, to said thin optical film; and
j. laminating or casting the thin optical film to an eyeglass lens blanks to make an eyeglass lens,
wherein the soluble polymer solution has a polymer concentration between 9% and 25%, inclusive; the dye solution has a dye concentration between 0.05% and 5%, inclusive; the eyeglass lens has an absorption rate in the ultraviolet and infrared frequency range, the absorption rate comprising an average of more than 37% for lights with wavelengths of 760-2000 nm.

17. The method of claim 16, wherein the polymer solvent comprises at least one of water, triphenyl, phosphate, diphenyl phosphate, dichloromethane, methanol, resorcinol, tetraphenyl diphosphate, acetone, butanol, butyl acetate, biphenyl diphenyl phosphate, trichloromethane, methyl ethyl ketone, ethyl acetate, isopropyl alcohol, methyl isobutyl ketone, butoxyethanol, methoxyethanol, cyclohexanone, tetrahydrofuran, ether, esters, polyimides, dimethylformamide, polyvinyl alcohol, methyl cellulose, starch derivatives, gelatine, methyl-ethyl ketone, or methylene chloride.

18. A method of manufacturing an eyeglass lens comprising at least one layer that uses a functional film containing photochromic dye or laser dye, the method comprising the steps of:
 a. adding a polymer solvent comprising dichloromethane to a soluble polymer to make a soluble polymer solution;
 b. adding a dye solvent to an oil-based soluble IR dye to make a soluble dye solution;
 c. adding the dye solution to the polymer solution to make a dyed polymer solution;
 d. applying the dyed polymer solution onto a flat surface;
 e. allowing said dyed polymer solution to solidify as a thin optical film on the flat surface;
 f. applying a photochromic dye solution or a laser dye solution, or combination thereof, to said thin optical film; and
 g. laminating or casting the thin optical film to an eyeglass lens blank to make an eyeglass lens,
 wherein the polymer solution has a polymer concentration between 9% and 25%, inclusive; the dye solution has a dye concentration between 0.05% and 5%, inclusive; the eyeglass lens has an absorption rate in the ultraviolet and infrared frequency range, the absorption rate comprising an average of more than 37% for lights with wavelengths of 760-2000 nm.

19. The method of claim 18, wherein the polymer solvent comprises at least one of water, triphenyl, phosphate, diphenyl phosphate, dichloromethane, methanol, resorcinol, tetraphenyl diphosphate, acetone, butanol, butyl acetate, biphenyl diphenyl phosphate, trichloromethane, methyl ethyl ketone, ethyl acetate, isopropyl alcohol, methyl isobutyl ketone, butoxyethanol, methoxyethanol, cyclohexanone, tetrahydrofuran, ether, esters, polyimides, dimethylformamide, polyvinyl alcohol, methyl cellulose, starch derivatives, gelatine, methyl-ethyl ketone, or methylene chloride.

20. A method of manufacturing an eyeglass lens comprising at least one layer that uses a functional film containing photochromic dye or laser dye, the method comprising the steps of:
 a. providing a soluble polymer;
 b. adding a polymer solvent to said polymer to make a soluble polymer solution;
 c. providing an infrared (IR) oil-based soluble dye;
 d. adding a dye solvent to said IR oil-based soluble dye to make a soluble dye solution;
 e. adding said dye solution to said polymer solution thereby making a dyed polymer solution;
 f. applying said dyed polymer solution onto a running belt;
 g. allowing said dyed polymer solution to solidify as a thin optical film on said running belt;
 h. removing said thin optical film from the running belt;
 i. applying a photochromic dye solution or laser dye solution, or combination thereof, to said thin optical film; and
 j. laminating or casting the thin optical film to an eyeglass lens blank to make an eyeglass lens,
 wherein the thin optical film has a thickness between 0.015 mm-3.0 mm; the eyeglass lens has an absorption rate in the ultraviolet and infrared frequency range, an average of absorption rate comprising more than 37% for lights with wavelengths of 760-2000 nm.

21. The method of claim 20, wherein the polymer solvent comprises at least one of water, triphenyl, phosphate, diphenyl phosphate, dichloromethane, methanol, resorcinol, tetraphenyl diphosphate, acetone, butanol, butyl acetate, biphenyl diphenyl phosphate, trichloromethane, methyl ethyl ketone, ethyl acetate, isopropyl alcohol, methyl isobutyl ketone, butoxyethanol, methoxyethanol, cyclohexanone, tetrahydrofuran, ether, esters, polyimides, dimethylformamide, polyvinyl alcohol, methyl cellulose, starch derivatives, gelatine, methyl-ethyl ketone, or methylene chloride.

22. The method of claim 1, wherein the eyeglass lens comprises at least one layer of film, and laminating or casting the IR PVA polarized film comprises laminating or casting onto the at least one layer of film of the eyeglass lens.

23. The method of claim 9, wherein the eyeglass lens comprises at least one layer of film, and laminating or casting the IR PVA polarized film comprises laminating or casting onto the at least one layer of film of the eyeglass lens.

24. The method of claim 14, wherein the eyeglass lens comprises at least one layer of film, and laminating or casting the film comprises laminating or casting onto the at least one layer of film of the eyeglass lens.

* * * * *